United States Patent
Huron et al.

(10) Patent No.: US 12,448,246 B2
(45) Date of Patent: Oct. 21, 2025

(54) METHOD OF CONFIGURING AN ELEVATOR SYSTEM

(71) Applicant: Otis Elevator Company, Farmington, CT (US)

(72) Inventors: Tony Huron, Saint Martin sur Ocre (DE); Bruno Beignet, Saint Gondon (FR); Fabien Leze, Neuvy sur Loire (FR); Romain Durand, Amilly (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 1375 days.

(21) Appl. No.: 17/099,469

(22) Filed: Nov. 16, 2020

(65) Prior Publication Data

US 2021/0371232 A1 Dec. 2, 2021

(30) Foreign Application Priority Data

May 26, 2020 (EP) .................................... 20315264

(51) Int. Cl.
*B66B 1/34* (2006.01)
*B66B 1/46* (2006.01)

(52) U.S. Cl.
CPC .......... *B66B 1/3423* (2013.01); *B66B 1/3453* (2013.01); *B66B 1/3461* (2013.01); *B66B 1/468* (2013.01); *B66B 2201/4638* (2013.01); *B66B 2201/4653* (2013.01)

(58) Field of Classification Search
CPC ... B66B 1/3423; B66B 1/3453; B66B 1/3461; B66B 1/468; B66B 2201/4653; B66B 2201/4638

USPC ......................................................... 187/387
See application file for complete search history.

(56) References Cited

U.S. PATENT DOCUMENTS

| 8,177,031 | B2 | 5/2012 | Flynn et al. |
| 8,573,364 | B2 | 11/2013 | Fang et al. |
| 9,290,359 | B2 | 3/2016 | Armistead et al. |

(Continued)

FOREIGN PATENT DOCUMENTS

| CN | 103625997 B | 8/2015 |
| CN | 105984769 A | 10/2016 |
| EP | 2142460 B1 | 8/2011 |

(Continued)

OTHER PUBLICATIONS

Akane (KR 20140009506 A)Notification System for Elevator (Year: 2014).*

(Continued)

*Primary Examiner* — Jorge L Carrasquillo
(74) *Attorney, Agent, or Firm* — CANTOR COLBURN LLP

(57) ABSTRACT

A method of configuring an elevator system (1), includes positioning a wireless communication device (4, 4') on or within an elevator car (2). When the elevator car (2) is in the vicinity of a landing floor (8a) of the elevator system (1), the wireless communication device (4, 4') transmits data comprising a unique identification code, or part thereof (26, 44) to a landing fixture (10a, 12a, 14a, 16a, 18a) on the landing floor (8a). The landing fixture (10a, 12a, 14a, 16a, 18a) receives the data. The method further includes, based on the received data, the landing fixture (10a, 12a, 14a, 16a, 18a) storing the unique identification code (44).

12 Claims, 7 Drawing Sheets

(56) References Cited

U.S. PATENT DOCUMENTS

2007/0246306 A1   10/2007   Tschuemperlin et al.

FOREIGN PATENT DOCUMENTS

| | | |
|---|---|---|
| EP | 1847499 B1 | 6/2015 |
| EP | 3228576 A1 | 10/2017 |
| EP | 3061212 B1 | 7/2018 |
| EP | 3356270 B1 | 8/2019 |
| JP | 2003146546 A | 5/2003 |
| JP | 6127004 B2 | 5/2017 |
| WO | 0034170 A1 | 6/2000 |
| WO | 2017016937 A1 | 2/2017 |
| WO | 2017055177 A1 | 4/2017 |
| WO | 2019048731 A1 | 3/2019 |
| WO | 2020031331 A1 | 2/2020 |

OTHER PUBLICATIONS

Shin (KR 20160012314 A) Automatic Control System of Elevator Based on Handicapped Person Identification and the Control Method Thereof (Year: 2016).*
European Search Report for application EP 20315264.0, dated Nov. 13, 2020, 53 pages.
European Search Report for application EP 20315264.0, dated Aug. 10, 2023, 6 pages.

* cited by examiner

METHOD OF CONFIGURING AN ELEVATOR SYSTEM

FOREIGN PRIORITY

This application claims priority to European Patent Application No. 20315264.0, filed May 26, 2020, and all the benefits accruing therefrom under 35 U.S.C. § 119, the contents of which in its entirety are herein incorporated by reference.

TECHNICAL FIELD

This disclosure relates to a device for carrying out configuration of landing fixtures in an elevator system.

BACKGROUND

A standard elevator system includes a number of landing fixtures at each landing, for example a hall lantern, a hall position indicator and a hall button box. During field installation of an elevator system, each of these landing fixtures must be programmed with a unique address, so that the elevator system controller can communicate individually with each landing fixture.

The current process is for a mechanic to manually set up each landing fixture. In particular, the mechanic will open the outer housing of a particular fixture, and will manually set the particular address for that fixture by setting switches on the internal electronic board of the fixture. The mechanic will then close this housing, and repeat this process for every fixture on each landing.

This process is time consuming and there is a high risk of the mechanic introducing errors into the system, for example mistakenly programming a landing fixture with an incorrect address due to human error. The present disclosure seeks to provide an improved method of configuring an elevator system.

SUMMARY

According to a first aspect of this disclosure there is provided a method of configuring an elevator system, comprising: positioning a wireless communication device on or within an elevator car; when the elevator car is in the vicinity of a landing floor of the elevator system, the wireless communication device transmitting data comprising a unique identification code, or part thereof to a landing fixture on the landing floor; the landing fixture receiving the data; and based on the received data, the landing fixture storing the unique identification code.

By providing the unique identification code, or part thereof using a wireless communication device positioned within or on the elevator car, manual programming of the unique identification code is not required and therefore a simple and more robust method is provided for configuring an elevator system, in particular for configuring the unique addresses of landing fixtures of the elevator system.

The wireless communication device may transmit the whole of the unique identification code which is then received and stored at the landing fixture. Alternatively, a part of the unique identification code may be transmitted by the wireless communication device and combined with another part of the unique identification code on the landing fixture to create the complete unique identification code which is then stored on the landing fixture. In this latter case, the individual parts of the unique identification code do not need to be unique in themselves, so long as when combined together, the resulting combination is unique.

In a first set of examples, the data sent by the wireless communication device comprises a landing floor identifier associated with the landing floor (i.e. the current landing floor of the elevator car). In a simple (e.g. single hoistway) elevator system, the combination of a landing floor identifier and a landing fixture type identifier can together form a unique identification code. In such examples, each floor may contain several landing fixtures such as a Hall Lantern Light, a Hall Position Indicator, a Hall Button Box, a Hall Option Box, etc. each of which has a certain landing fixture type identifier (unique to each type of fixture) stored thereon, e.g. programmed in during manufacture. Providing that there is only one of each type of fixture per landing then combining that landing fixture type identifier with a landing identifier (a unique code for each landing) will result in a unique code for each landing fixture in the whole system. In more complicated systems with more than one elevator or group of elevators it may be necessary to add in further information to create a unique identifier, e.g. additionally incorporating a group identifier or hoistway identifier or the like together with the landing fixture type identifier and the landing floor identifier. This additional elevator system information therefore allows a landing fixture to be uniquely identified even in a large elevator system in which a single floor includes more than one landing fixture of a given type.

Optionally, the wireless communication device transmits the data (including the landing floor identifier) to the landing fixture, and the landing fixture is configured to generate the unique identification code. In some examples, the landing fixture stores a landing fixture type identifier, and the landing fixture is configured to generate the unique identification code from at least the landing floor identifier and the landing fixture type identifier. Thus, each landing fixture in the elevator system shares a common scheme, rule, or formula to generate a unique identification code from a received landing floor identifier and a stored landing fixture type identifier (and optionally other data). A method according to these examples can be implemented very simply, only requiring the wireless communication device to transmit a floor identifier (or a combination of floor identifier and other data). All processing can be done on the landing floor fixtures at which the floor identifier is received. However, if it is desired to reconfigure the system, and in particular to alter the scheme, rule or formula by which the addresses (unique identification codes) of the landing fixtures are generated, then each landing fixture will need to be altered (updated) individually.

In a second set of examples, the data sent by the wireless communication device comprises the unique identification code (i.e. the whole unique identification code rather than only a part of it). Thus, the method optionally comprises the wireless communication device transmitting the unique identification code to the landing fixture. This helps to allow each landing fixture to have a simple construction and require minimal components. Each landing fixture need only contain a simple receiver, in order to receive and store the transmitted unique identification code. In these examples the landing fixtures do not need to carry out complex processing, as the generation of the unique identification code is carried out by the wireless communication device. Thus the landing fixture can be kept simple.

The unique identification code may be provided by the elevator system e.g. by the controller and provided to the wireless communication device, or it may be generated by the wireless communication device itself. The unique identification code may be generated in any suitable manner, e.g. by using a sequence of unique identification codes and generating a new sequence item each time a new unique identification code is required. Such codes could be generated according to a scheme, rule or formula, or they could be pre-generated, stored in a lookup table and fetched in sequence. The scheme, rule or formula could be the same as that discussed above, based on combinations of a landing fixture type identifier and a floor identifier (and optionally other data). The wireless communication device could generate the unique identification codes on each floor according to existing knowledge or an expectation of which landing fixture types will be on each floor (in which case the landing fixture type identifiers can be stored on the wireless communication device). Alternatively, the wireless communication device can obtain information from each landing (e.g. from each landing fixture on a given landing) to establish which landing fixtures are present and need a unique identification code. This process may include the landing fixtures transmitting their individual landing fixture type identifiers to the wireless communication device for use in generation of the unique identification code.

Thus, in some examples, the method further comprises the landing fixture storing a landing fixture type identifier, and transmitting the landing fixture type identifier to the wireless communication device. In these examples, each landing fixture also comprises a transmitter.

In cases where the unique identification code is generated according to a scheme, rule or formula using known information about the elevator system, there is no need to keep track of which unique identification code has been stored in each landing fixture as the code for any given landing fixture can be generated on demand using the scheme, rule or formula. For example, if the system or a maintenance engineer wants to address the Hall Position Indicator on Floor 5, the unique identification code for that landing fixture can be generated by using the scheme, rule or formula to combine the landing fixture type identifier for a Hall Position Indicator with the floor identifier for Floor 5 (and optionally any other data required by the scheme, rule or formula as discussed above). Alternatively, in cases where the unique identification code is generated from a list or sequence and is therefore not directly recreatable from the landing fixture type identifier, floor identifier, etc., then the association between the unique identification code and the landing fixture must be stored somewhere in the system so that it can be looked up when required. In such examples, at the time of allocating a unique identification code to a landing fixture, the method also comprises storing an association between the unique identifier and at least the landing fixture type identifier and the landing floor identifier. The association may of course also include other data such as one or more of: elevator identifier, group identifier, hoistway identifier, etc.

In some examples, the wireless communication device first associates a unique identification code with a received landing fixture type identifier, and a landing floor identifier, and then sends the unique identification code to the landing fixture. The elevator system may store the association between the landing fixture type identifier, the landing identifier and the unique identification code e.g. in an elevator system controller.

In some examples, the wireless communication device comprises a scheme, rule, or formula to compute a unique identification code. This scheme, rule, or formula may be stored as software in a memory. This scheme, rule or formula could be changed if desired and the landing fixtures of an elevator system reconfigured with a new addressing system. This scheme, rule or formula could also be chosen to be different for different elevator systems.

According to a second aspect of the present disclosure, there is provided a software product, comprising a memory storing software, which, when executed, causes a wireless communication device to carry out the steps of: receiving a landing fixture type identifier from a landing fixture; generating a unique identification code; transmitting the unique identification code to the landing fixture.

According to a third aspect of the present disclosure, there is provided an elevator car, comprising: a wireless communication device, positioned on or within the elevator car, wherein the wireless communication device is configured to carry out the steps of: receiving a landing fixture type identifier from a landing fixture; providing a landing floor identifier corresponding to a landing floor, when an elevator car is in the vicinity of the landing floor of an elevator system; generating a unique identification code; transmitting the unique identification code to the landing fixture.

According to a fourth aspect of the present disclosure, there is provided an elevator system, comprising: an elevator car as described herein; at least one landing floor, wherein the landing floor comprises at least one landing fixture, comprising a memory storing a landing fixture type identifier, wherein the landing fixture is arranged to transmit the landing fixture type identifier to the wireless communication device.

In some examples, the elevator system further comprises an elevator controller, wherein the elevator controller is arranged to communicate with the wireless communication device. In some examples, the method further comprises the wireless communication device communicating with an elevator system controller. Optionally the elevator system controller provides the landing floor identifier to the wireless communication device. The elevator controller may obtain the landing floor identifier from sensors in the hoistway which can detect the presence of the car, or from other positioning systems used within the elevator system for example. Thus, in some examples, the wireless communication device is provided with the landing floor identifier automatically. Alternatively, in other examples, the wireless communication device is configured to receive a manual input, wherein the manual input provides the landing floor identifier (e.g. a mechanic may enter the current landing floor via a user interface of the wireless communication device). In these examples, the elevator controller or the manual input may provide the landing floor identifier directly, or may provide an indication of the current landing floor i.e. floor information, which the wireless communication device may then use to retrieve the landing floor identifier e.g. from a lookup table.

The elevator system includes at least one landing floor, wherein the landing floor comprises at least one landing fixture. In some examples, the at least one landing fixture is selected from the group comprising: a hall position indicator, a hall lantern, a hall button box or a hall option box. It will be understood by the skilled person that a hall position indicator is a landing fixture arranged to indicate the current floor of a particular elevator car. It will similarly be understood by the skilled person that a hall lantern is a landing fixture arranged to indicate the current direction of travel of a particular elevator car. It will similarly be understood by the skilled person that a hall button box is a landing fixture arranged to include call buttons, which a passenger may use to place an elevator call. It will similarly be understood by the skilled person that a hall option box is a landing fixture, which is accessible only by select users, and which allows these users to access certain features e.g. priority service, or sending an elevator car to a particular chosen floor e.g. a parking lot floor. It will be appreciated that these are just some examples of landing fixtures and the system here applies to any landing fixture.

The landing fixture stores a landing fixture type identifier. It will be understood by the skilled person that the "landing fixture type identifier" relates to, or denotes, the particular kind of landing fixture. The landing fixture type identifier does not uniquely identify a particular landing fixture (i.e. a particular unit) but identifies a category of landing fixtures, for example, according to the above examples, the landing fixture type identifier might indicate that the landing fixture is a "hall lantern" or a "hall position indicator", etc.

It is desirable that when an elevator car is located at or in the vicinity of a particular floor of the elevator system, the wireless communication device is in communication only with the landing fixtures at that particular landing floor i.e. the wireless communication device is not in communication with the landing fixtures of the adjacent floors. This may be achieved in any suitable manner. For example, the elevator car and/or the landing floor may comprise certain materials which block transmission of signals to and from the wireless communication device, thus preventing the wireless communication device, when located at one landing floor, from transmitting signals to, or receiving signals from, an adjacent floor or any other floor of the building.

Alternatively, or additionally, the range of the wireless communication device may be selected or restricted so as to be limited in extent. It will be understood by the skilled person that the wireless communication range refers to the distance, in any direction, over which the wireless communication device is able to transmit a detectable signal. In some examples, the wireless communication range of the wireless communication device is selected to be no more than (or approximately equal to) half of the height of a landing floor. This ensures that the total height covered by the range of the wireless communication device is no more than (or approximately equal to) a landing floor total height. Assuming that the landing floors are the same height and that the landing fixtures are arranged in a similar manner on all floors, this should ensure that the wireless communication device can only ever see one set of landing fixtures at any one time. Depending on the location of the wireless communication device relative to a landing floor, it is possible that the set of landing fixtures could comprise some landing fixtures from one floor and some landing fixtures from an adjacent floor. This is not a problem so long as the wireless communication device (or system) knows, because of the current position of the wireless communication device, which landing fixtures are located on each floor. However, in some examples it will be beneficial to ensure that the range of the wireless communication device is restricted to one landing floor so that it can only communicate with landing fixtures on that floor while all of those landing fixtures are configured with unique identification codes. This arrangement will be particularly beneficial in the case of manual input of current floor information (such as a landing floor identifier).

In some examples, the wireless communication range of the wireless communication device may be no more than 2 m, optionally no more than 1.5 m, further optionally no more than 1 m.

The position of the wireless communication device within the elevator car may be selected so that the range of the wireless communication device extends to cover all of the landing fixtures on a particular landing while the elevator car is positioned at that landing. In such arrangements, by appropriate positioning of the wireless communication device, it may be possible to reduce the range of the wireless communication device so as to minimise the chances of overlap to adjacent floors. In some examples, the wireless communication device is positioned centrally with respect to the height of the elevator car. It will be understood by the skilled person that the wireless communication device being positioned "centrally" with respect to the height of the elevator car does not require that the device is positioned equidistantly between a floor and a ceiling of the elevator car. Rather the device can be positioned across a range of heights, but is not close to an extreme of the elevator height e.g. not adjacent to the elevator car ceiling or the elevator car floor. In some examples, the wireless communication device may be positioned at least 50 cm above the floor of the elevator car, optionally at least 1 m. It is expected that during normal operation, if the elevator car stopped at a landing floor, the floor of the elevator car would be at approximately the same height as the floor of the landing floor.

In some examples each of the at least one landing fixtures comprises a radio-frequency identification tag. Thus, in some examples the wireless communication device is arranged to transmit and receive radio waves. This advantageously provides a simple method of wireless communication. In some examples, the frequency of the radio waves may be chosen to achieve the communication ranges as described above. For example, the wireless communication device may use high frequency radio waves. For example the frequency may be at least 500 kHz, at least 1 MHz or at least 3 MHz. Purely by way of example, the communication frequency range could use 13.56 MHz±7 kHz. This allow a communication range between 10 cm and 1 m. The radio-frequency identification tag may receive information from the wireless communication device and this information may be stored in the memory of the landing fixture.

As described above, in some examples the landing fixture stores a landing fixture type identifier and the landing fixture transmits the landing fixture type identifier to the wireless communication device. The landing fixture may transmit its landing fixture type identifier constantly, so that when the elevator car is present in the vicinity of the landing floor, the wireless communication device will begin to receive the landing fixture type identifiers for each landing fixture of that landing floor. However, this would consume a large amount of power unnecessarily. Thus, in some examples, an initiation signal is transmitted using the wireless communication device, and the landing fixture is arranged to receive the initiation signal, and transmit the landing fixture type identifier to the wireless communication device in response to receipt of the initiation signal. This allows the wireless communication device to determine the start of a particular configuration cycle.

In some examples, after storing the unique identification code, the landing fixture transmits an acknowledgement signal to the wireless communication device. This helps to ensure that the configuration has successfully been carried out. For example if the wireless communication device does not receive an acknowledgement from a landing fixture, the wireless communication device may repeat the configuration method for that landing fixture, until an acknowledgement is received.

Although the configuration method described herein only requires that the elevator car be in a vicinity of a landing floor, in some examples the method may further comprise stopping the elevator car at the landing floor. This may improve the accuracy of the configuration, by reducing the risk of communication with landing fixtures of other floors. This also allows more time for the floor identifier to be provided e.g. by manual input, as described above.

In some examples, the wireless communication device is a mobile communication device, optionally a smart phone or the like. Such a mobile communication device may be carried by a maintenance person, or attached to a maintenance person e.g. when the maintenance person travels in the elevator car to carry out configuration and testing of an elevator system. The mobile communication device may be worn at a specific height or within a certain range of heights by the maintenance person. This helps to ensure that the mobile communication device only communicates with the landing fixtures of a particular landing floor, as described above.

In other examples, the wireless communication device may be fixed in position within the elevator car. Thus, in some examples, the method may further comprise fixing the wireless communication device in position within the elevator car. The fixing may be achieved by mounting the wireless communication device to the car. Such fixing may be permanent or semi-permanent. The wireless communication device may optionally be fixed to or within a structural component of the elevator car. In some examples it is fixed to or within a car door column of the elevator car. The fixing of the wireless communication device allows the wireless communication device to be fixed at an optimum height, and prevents any variation in position of the wireless communication device during configuration. A wireless communication device which is fixed to or within the elevator car can also be more easily connected e.g. wired to the elevator controller, in order to receive the floor identifier (and optionally other information), in some examples as laid out above. Optionally, the wireless communication device may communicate with the landing fixture of the landing floor, using the unique identification code, whenever the elevator car is in the vicinity of the landing floor during normal operation of the elevator system. Thus the fixed wireless communication device advantageously has ongoing communication with the landing fixtures, even after they have been initially configured. The landing fixtures may communicate their respective status or error information to the mobile communication device. In some examples, the wireless communication device is arranged to transmit the respective status or error information to another part of the elevator system such as an elevator controller, or a maintenance server, which may be a local server or a cloud server.

In some examples, the landing floor comprises at least a first landing fixture and a second landing fixture, and the wireless communication device carries out the method as described above for the first landing fixture and then the second landing fixture, sequentially. Addressing each landing fixture sequentially helps to prevent any errors in configuration due to data transmission collisions.

In some examples, additionally or alternatively, the method as described above is repeated for at least two landing floors in an elevator system. Optionally, the method as described above is repeated for every landing floor in the elevator system. Once the described method has been carried out at every landing floor, each landing fixture at each floor has stored a unique identification code corresponding to that particular landing fixture. This allows an elevator system controller, receiving a signal from one of the landing fixtures, to identify exactly which landing fixture the signal originated from. It also allows the elevator system to send communications to each landing fixture within the system independently if communication is required. The process as described herein for configuring every landing floor in the elevator system is significantly faster and less prone to error than known methods in which each landing fixture on each floor is configured manually, one at a time, by a maintenance person calculating the address code, and manually inputting this information to each landing fixture by setting switches on the internal circuit board.

DRAWING DESCRIPTION

Certain preferred examples of this disclosure will now be described, by way of example only, with reference to the accompanying drawings, in which.

DETAILED DESCRIPTION

Figure 1:
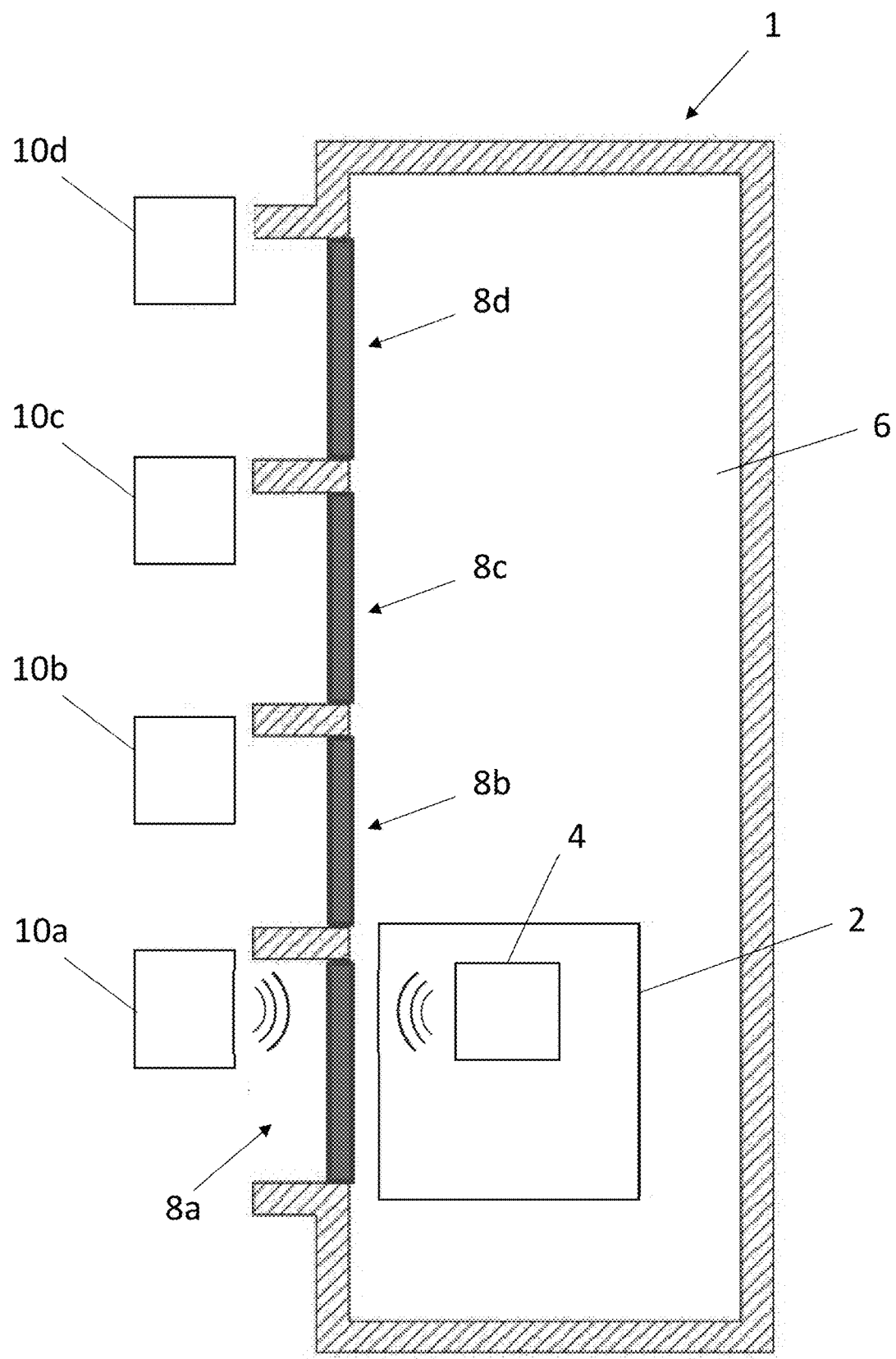
FIG. 1 is a schematic drawing showing an elevator system according to an aspect of the present disclosure.

FIG. 1 shows an elevator system 1 according to an example of the present disclosure. The elevator system 1 includes an elevator car 2 within which there is positioned a wireless communication device 4. The elevator car 2 is arranged to travel within a hoistway 6 to a plurality of landing floors 8a, 8b, 8c, 8d of the elevator system 1. Each landing floor 8a, 8b, 8c, 8d includes at least one landing fixture 10a, 10b, 10c, 10d. As shown schematically in FIG. 1, when the elevator car 2 is located at a particular landing floor 8a, the wireless communication device 4 is able to communicate wirelessly with the at least one landing fixture 10a.

Figure 2:
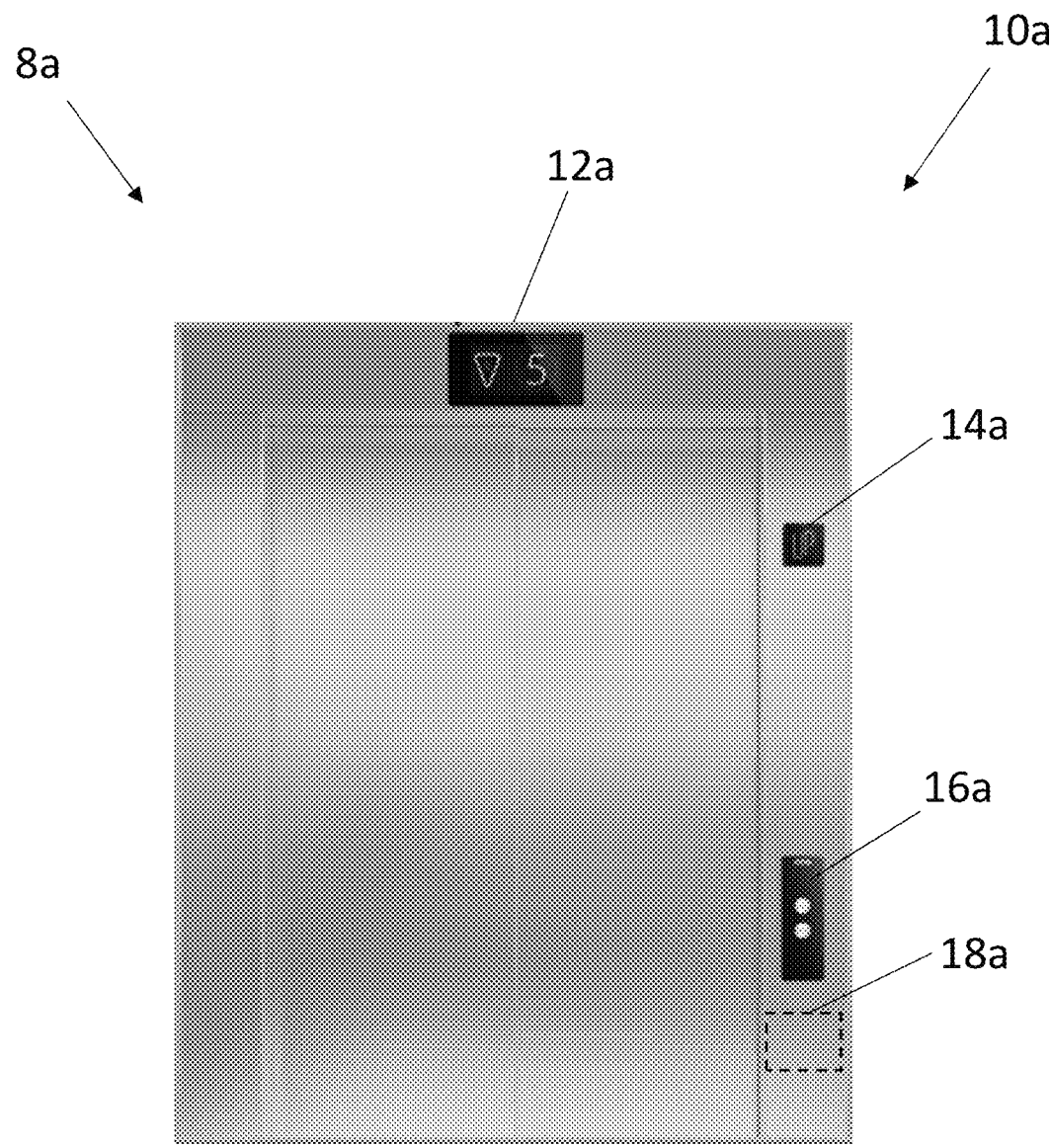
FIG. 2 is a view showing a landing floor of the elevator system of FIG. 1.

FIG. 2 shows an exemplary landing floor 10a of the elevator system 1. Although FIG. 2 illustrates the lowest landing floor (denoted with the reference "a"), the statements made below apply equally to the other landing floors, denoted with "b", "c" and "d", and to the landing fixtures of these floors). The elevator doors are visible, as would be seen by a passenger standing at the landing floor 10a, waiting for the arrival of an elevator car 2. In the view of FIG. 2, certain exemplary landing fixtures are shown.

The at least one landing fixture 10a present on this landing floor are a hall position indicator 12a, a hall lantern 14a, a hall button box 16a and a hall option box 18a. The hall position indicator 12a is a landing fixture arranged to indicate the current floor of a particular elevator car 2. The hall lantern 14a is a landing fixture arranged to indicate the current direction of travel of a particular elevator car 2. The hall button box 16a is a landing fixture arranged to include call buttons, which a passenger may use to place an elevator call. The hall option box 18a is a landing fixture, which is accessible only by select users, and which allows these users to access certain features e.g. priority service, sending an elevator car to a particular chosen floor e.g. a parking lot floor. The control buttons within this hall option box may be accessible only by using a certain key or an access code, known only to certain users. These same types of landing fixture, or a selection of them, may be present on the other landing floors 8*b*, 8*c*, 8*d*.

Figure 3:
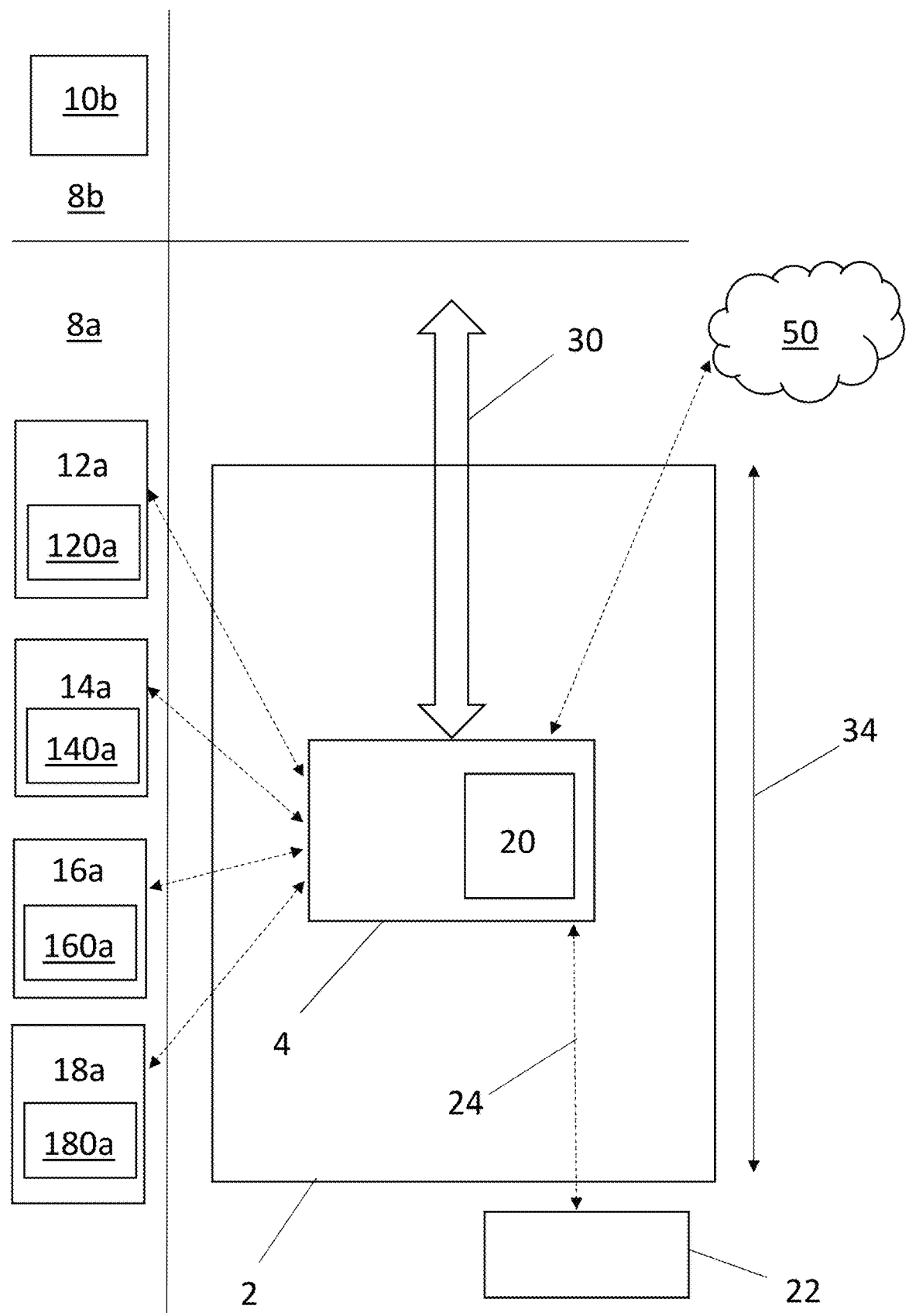
FIG. 3 is a schematic drawing showing an elevator system according to a first example of the present disclosure.

FIG. 3 shows schematically these landing fixtures in communication with the wireless communication device 4. The wireless communication device 4 includes a memory 20, which contains instructions which, when executed, cause the wireless communication device 4 to execute the method described below.

The wireless communication range 30 of the wireless communication device 4 is illustrated in FIG. 3. As can be seen in FIG. 3, the wireless communication range 30 in any given direction is sufficient that the wireless communication device 4 can communicate with each landing fixture 12*a*, 14*a*, 16*a*, 18*a* on the current landing floor 8*a*, but is insufficient for the wireless communication device 4 to reach the landing fixtures 10*b* of the adjacent floor. For a standard height of landing floor 8*a*, a suitable wireless communication range 30 is around 1 m (giving a total communication coverage of 2 metres from 1 metre below the wireless communication device 4 to 1 metre above the wireless communication device 4).

The elevator car 2 has a height 34 between the floor of the elevator car 2 and the ceiling of the elevator car 2. As can be seen in FIG. 3, the wireless communication device 4 has been positioned substantially centrally with respect to this height 34. This helps to align the wireless communication range 30 of the wireless communication device 4 with the set of landing fixtures 12*a*, 14*a*, 16*a*, 18*a*, with which it is desired for the wireless communication device 4 to communicate, and to prevent communication with landing fixtures 10*b* on adjacent landing floors 8*b*.

In this example, the wireless communication device 4 is permanently fixed within the elevator car 2. The wireless communication device 4 is also in communication with an elevator system controller 22. The communication between the wireless communication device 4 and the controller 22 may be wired or wireless.

As shown in FIG. 3, each landing fixture 12*a*, 14*a*, 16*a*, 18*a* contains a respective radio-frequency identification tag 120*a*, 140*a*, 160*a*, 180*a*.

A radio frequency identification (RFID) tag includes a radio transponder (or a radio receiver and a radio transmitter). An RFID tag is triggered by an electromagnetic pulse, received from a nearby device e.g. the wireless communication device 4, and then responds with digital data e.g. a landing fixture type identifier. The frequency of the electromagnetic pulse emitted by the wireless device 4 may be chosen to provide a desired wireless communication range 30, for example the wireless communication device 4 may use high frequency radio waves, e.g. at a frequency of 13.56 MHz±7 kHz.

These radio frequency identification tags 120*a*, 140*a*, 160*a*, 180*a* can be a type of RFID tag known as "read/write", meaning that object-specific data can be written into the tag. For example, as described below, the RFID tag 120*a*, 140*a*, 160*a*, 180*a* may at first only transmit a landing fixture type identifier, but, once a unique identification code has been received by the tag 120*a*, 140*a*, 160*a*, 180*a*, it may overwrite or otherwise store the unique identification code, and when interrogated in future by a reader device, may respond with this unique identification code.

In other examples, in place of an RFID tag, a small microcomputer with a local memory and processor and a transmitter and receiver may achieve the same functionality by sending the landing fixture type identifier when requested and/or storing a received unique identification code.

Figure 4:
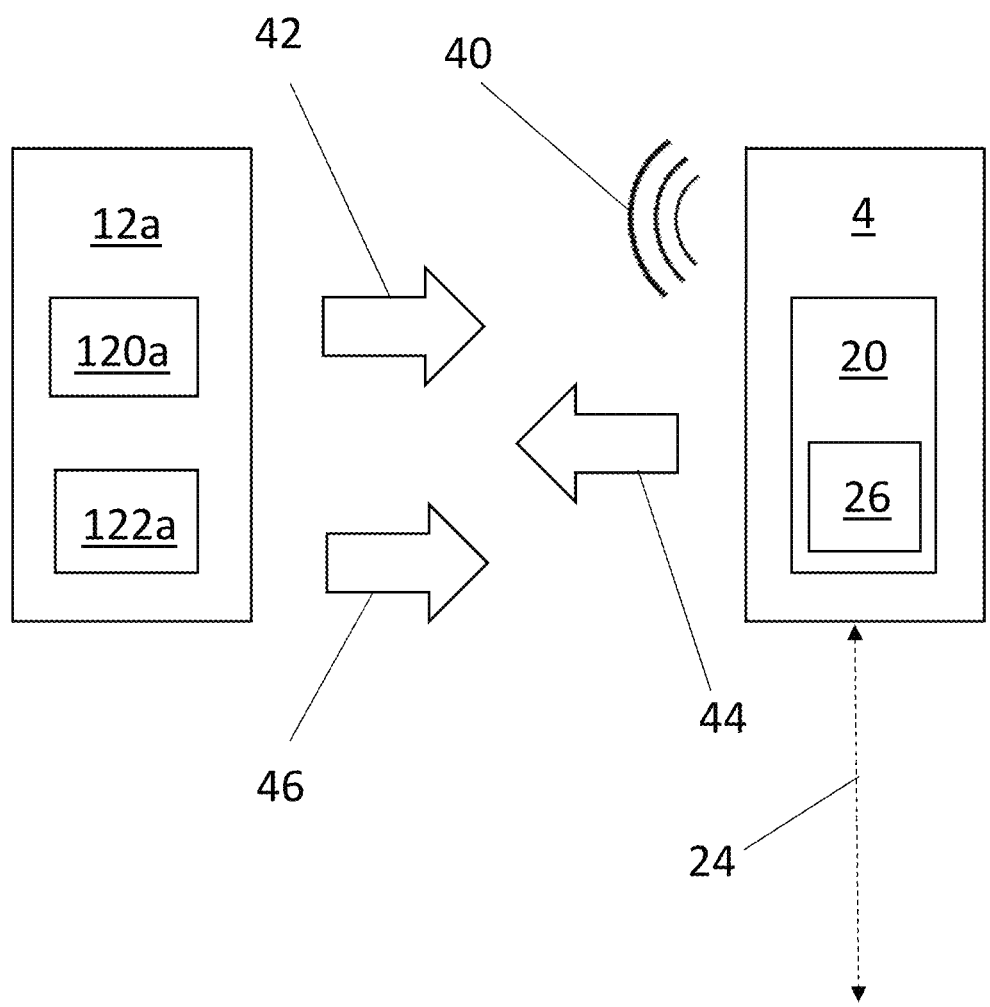
FIG. 4 is a schematic drawing showing the transmissions of data between a wireless communication device and a landing fixture, according to an example of the present disclosure.
Figure 5:
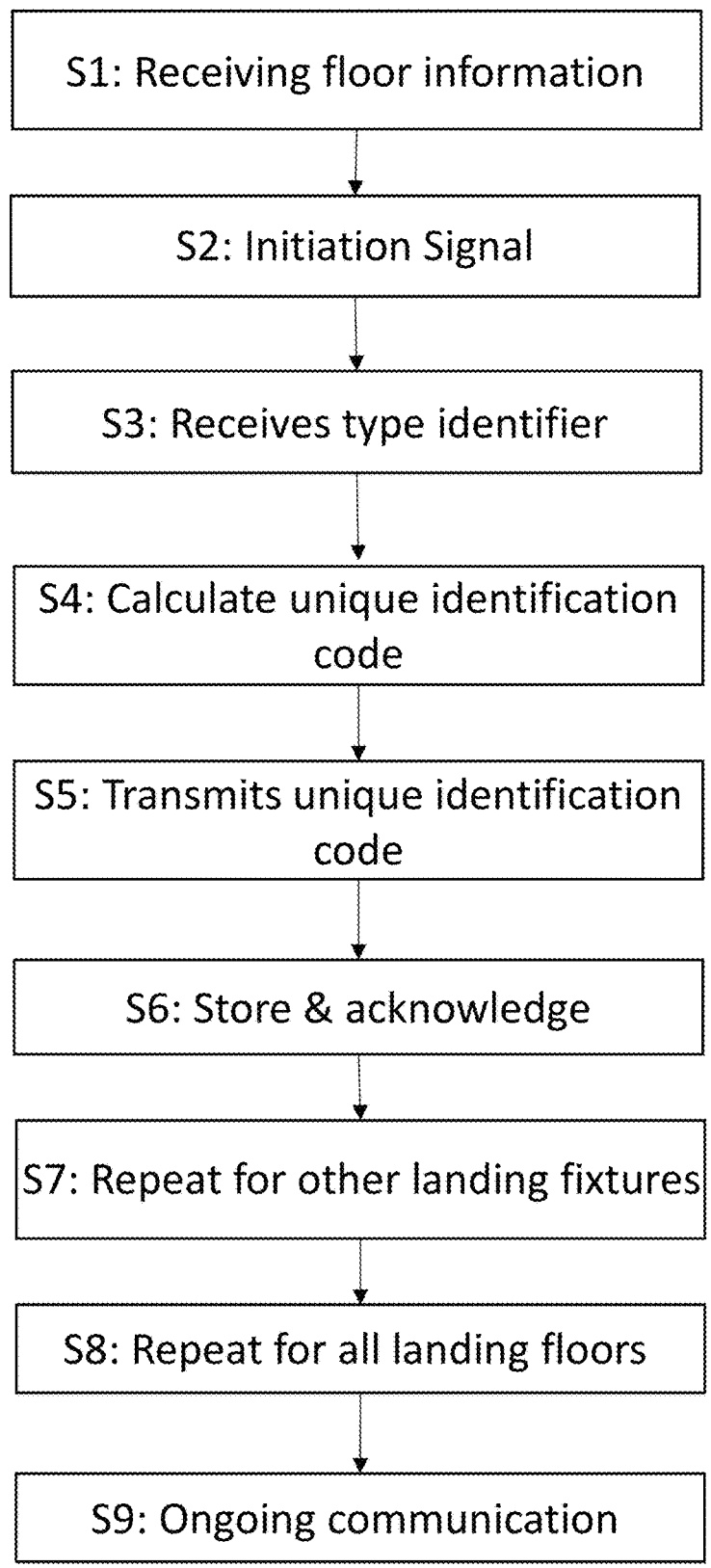
FIG. 5 is a flowchart showing a method according to a first example of the present disclosure.

The stages of this communication between the wireless communication device 4 and an exemplary one of the landing fixtures 10*a* (in this example the hall position indicator 12*a*) is shown in FIG. 4. The steps of this communication method are also shown in the flowchart of FIG. 5. The method is described below with reference to both FIG. 4 and FIG. 5.

At a first step S1, the wireless communication device 4 receives floor information from the elevator system controller 22. This floor information could be a landing floor identifier 26 which is a unique code identifying the current floor of the elevator car 2, or it could be other information regarding a specific landing floor, which allows the wireless communication device 4 to retrieve, or provide, the landing floor identifier 26. The landing floor identifier 26 may be stored in the memory 20 of the wireless communication device 4. This communication is represented by the dashed arrow 24 seen in FIGS. 3 and 4.

Additionally, either at the same time, before, or after this process, but after arrival of the elevator car 2 in the vicinity of a particular landing floor 8*a*, the wireless communication device 4 makes a transmission of an initiation signal 40. This is the step S2. The initiation signal 40 could be a general transmission by the wireless communication device 4, or could be directed to a particular landing fixture (e.g. hall position indicator 12*a* in this example). For example, each type of landing fixture e.g. a hall lantern 14*a*, could have the same general type of radio frequency identifier stored on their respective RFID card 140*a*. The initiation signal 40 could be directed to this particular landing fixture type identifier. The initiation signal 40 could for example be an electromagnetic pulse designed to trigger an RFID tag 120*a*, 140*a*, 160*a*, 180*a*.

Upon receipt of this initiation signal 40, the hall position indicator 12*a* transmits its landing fixture type identifier 42 to the wireless communication device 4. The landing fixture type identifier 42 relates to the particular kind of landing fixture 10*a* which is making the transmission, in this case the landing fixture type identifier 42 denotes that the landing fixture is a hall position indicator 12*a*. The landing fixture type identifier 42 is stored in a memory 122*a* of the hall position indicator 12*a* (and more generally each landing fixture 10*a* may include a memory storing its corresponding landing fixture type identifier). The memory 122*a*, although shown separately, may be part of the RFID tag 120*a*. The landing fixture type identifier 42 may therefore be the identifier associated with the RFID tag 120*a*. This is the step S3 shown in FIG. 5.

At the next stage, S4, the wireless communication device 4 generates a unique identification code 44 from the landing fixture type identifier 42, together with the landing floor identifier 26, which was received from the elevator system controller 22. The unique identification code 44 may be a binary code, derived from a combination (e.g. a concatenation) of the landing floor identifier 26 and the landing fixture type identifier 42. The scheme or rule for combining the landing floor identifier 26 and the landing fixture type identifier 42 is stored in the memory 20. At step S5 this unique identification code 44 is then transmitted to the hall position indicator 12*a*.

At step S6, the landing fixture, in this example the hall position indicator 12*a*, stores its unique identification code in memory 122*a*. This may for example involve changing or overwriting the ID code associated with the RFID tag 120*a*, to be the unique identification code 44. The hall position indicator 12a transmits an acknowledgement 46 to the wireless communication device 4, to confirm that the unique identification code 44 has been successfully stored.

The next stage of the process, S7, is to repeat this for each landing fixture 10a on the landing floor 10a. In this example, the process will therefore be repeated for the hall lantern 14a, the hall button box 16a and the hall option box 18a.

At step S8 the same process is then carried out at every other landing floors 8b, 8c, 8d of the elevator system 1.

At step S9, the elevator car 2 is carrying out normal operation i.e. after successful commissioning of the elevator system 1. During this normal operation the elevator car 2 regularly stops or passes in the vicinity of each landing floor 8a, 8b, 8c, 8d of the elevator system 1. On occasions when a landing fixture 10a 10b, 10c, 10d is within the communication range 30 of the permanently fixed wireless communication device 4, they may exchange information. For example, the landing fixture 10a, 10b, 10c, 10d sends to the wireless communication device 4 certain status and/or error information for example changes in power consumption or fault codes. The wireless communication device 4 then sends this information to cloud server 50, shown in FIG. 3. This cloud server may belong to the particular operator of the elevator system 1 or a contracted maintenance company, and may be stored and/or processed to provide additional feedback about when the elevator system 1 may require additional maintenance and the particular maintenance which may be required.

Figure 6:
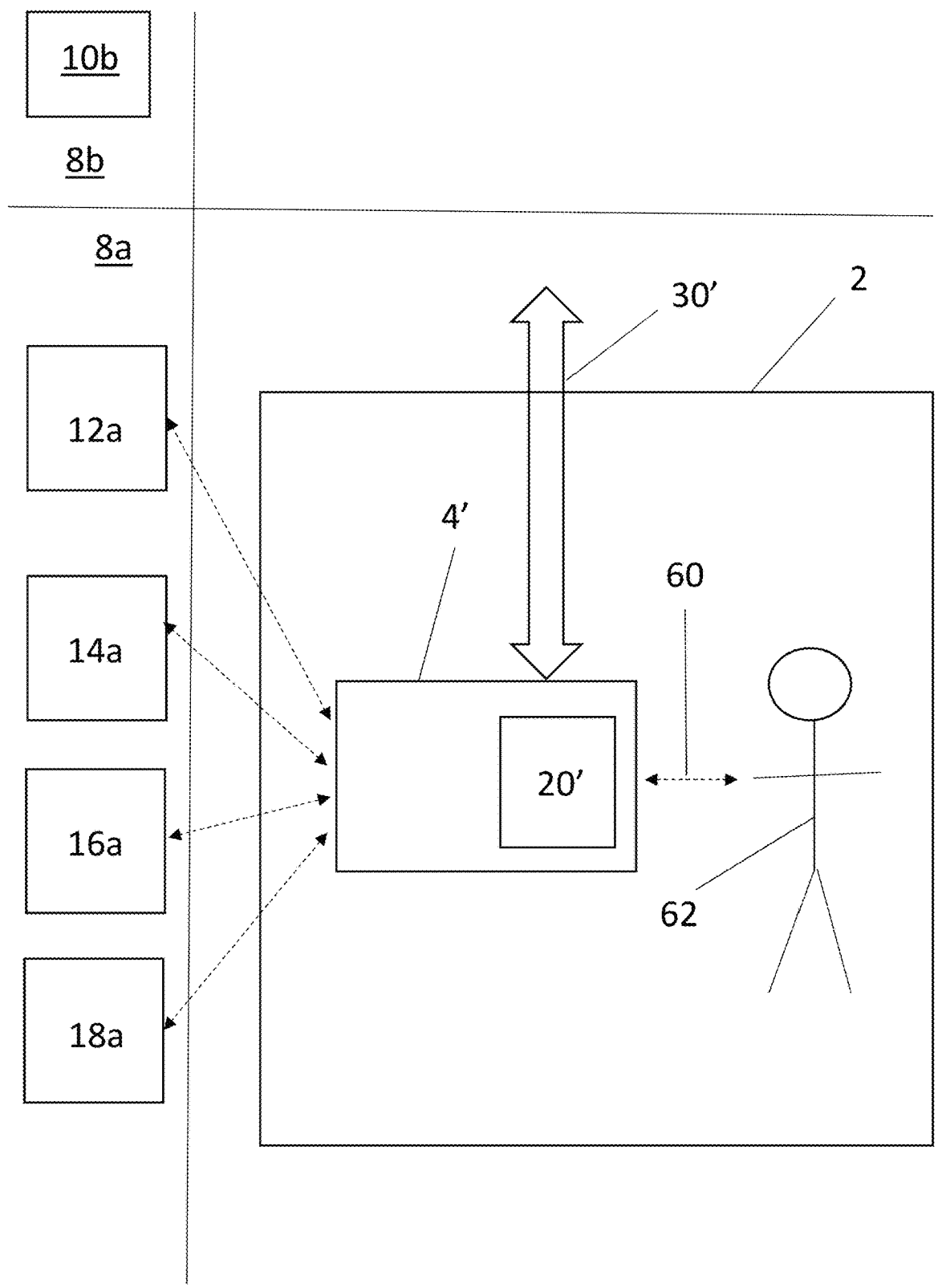
FIG. 6 is a schematic drawing showing an elevator system according to a second example of the present disclosure.

FIG. 6 shows a second example of a wireless communication device 4' according to the present disclosure. All other like components of the elevator system 1 are labelled with the same reference numerals as they are the same as those described with reference to FIGS. 1-5 above. In this example, the wireless communication device 4' is a mobile device, specifically a smartphone. This wireless communication device 4' operates largely as described above, however, in this example, it is not arranged in communication with an elevator system controller 22 (although in other examples such a connection could indeed be present). The wireless communication device 4' is arranged to receive a manual input 60, from a user 62 e.g. a maintenance person. A maintenance person may input information using an application installed on the wireless communication device (e.g. smart phone) 4'. The wireless communication device 4' may be carried by the user 62 e.g. in their hand, or may be placed within their clothing e.g. in a pocket. The user 62 may wear a specific item of clothing designed to hold the wireless communication device 4', for example to ensure that the wireless communication device 4' is positioned at a suitable height to carry out the method described herein.

The wireless communication range 30' of the wireless communication device 4' is shown in FIG. 6. As can be seen in FIG. 6, this wireless communication range 30' of the wireless communication device 4', together with positioning of the wireless communication device 4' at a suitable height, ensures successful communication of the wireless communication device 4' with all and only those landing fixtures 12a, 14a, 16a, 18a on the selected landing floor 8a which is being configured. Conveniently, a mobile wireless communication device 4' held in the hand or a jacket pocket of a maintenance person 62 is approximately 1 metre above the floor of the elevator car 2 and therefore when configured with a range of approximately 1 metre as discussed above, extends from approximately the floor of the elevator car 2 to a height of approximately 2 metres above the floor of the elevator car 2. Such a range 30' is likely to cover all required landing fixtures 12a, 14a, 16a, 18a. It will be appreciated that in other examples, if a greater range is required (e.g. to achieve a greater height at the top of the communication range 30') the mobile wireless communication device 4' can either be held at a higher height by the maintenance person 62 or the wireless communication device 4' can be given a slightly extended range, e.g. up to 1.5 metres.

Figure 7:
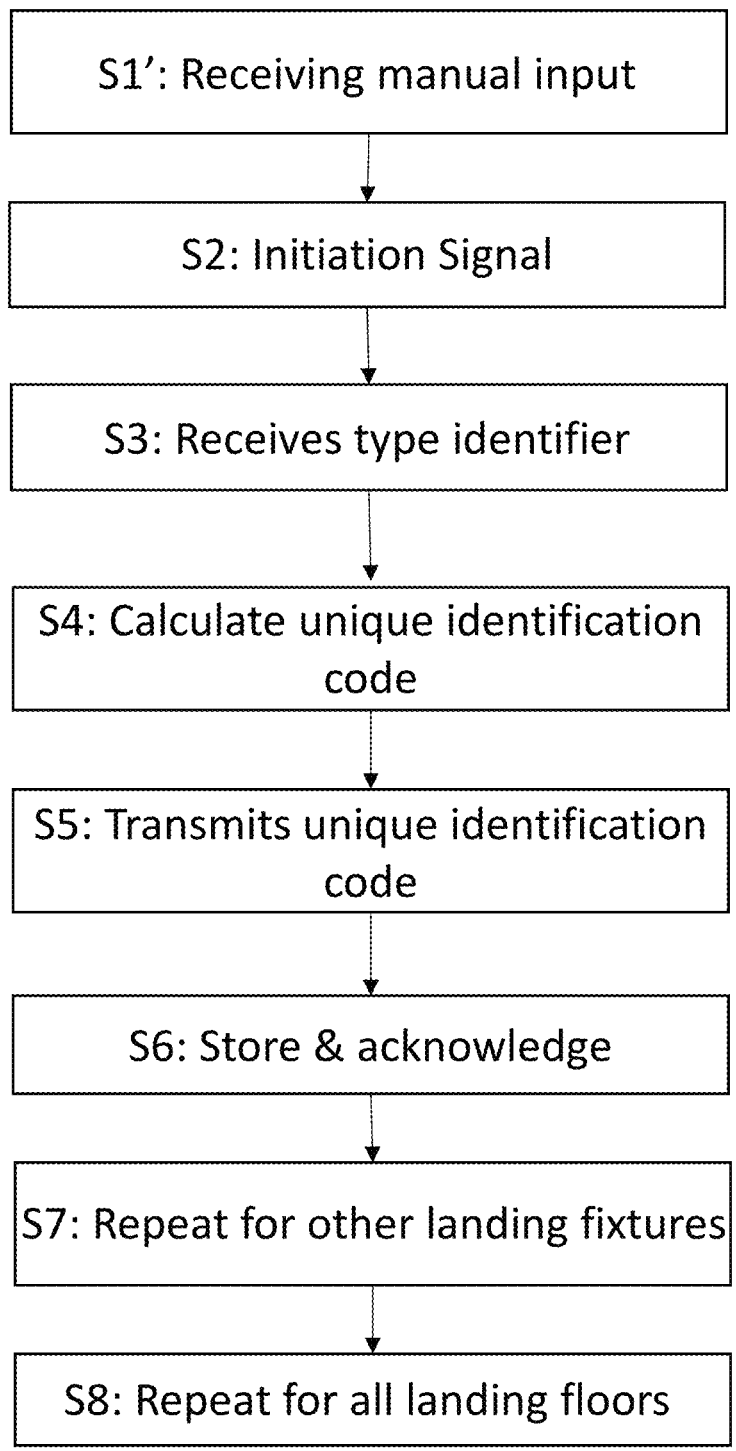
FIG. 7 is a flowchart showing a method according to a second example of the present disclosure.

FIG. 7 is a flowchart showing the stages of a method according to this second example of the present disclosure. FIG. 7 differs from the method of FIG. 5 only in the first step S1' (and also in the omission of the final step S9 which is present in the first example).

In this example, at step S1' the wireless communication device 4' receives a manual input 60 from the user 62. The manual input 60 provides floor information to the wireless communication device 4', this information could be the landing floor identifier 26, or could allow the wireless communication device 4' to retrieve the landing floor identifier 26 e.g. from a lookup table.

The method then proceeds with steps S2-S8, which are the same as those described above in relation to FIGS. 4 and 5. In this example the wireless communication device 4' is a mobile smartphone 4' carried by the user 62, e.g. maintenance person, and is therefore not permanently present within the elevator car 2. The wireless communication device 4' is therefore not present in the elevator car 2 during normal operation and so no ongoing communication occurs in this example.

Although the suffix "a" is used herein to denote the landing fixtures 10 of the first floor 8a, it will be understood by the skilled person that the features described herein apply equally to each equivalent landing fixture of each other landing floor of the elevator system ("b", "c", and "d"), and that the method described herein may be carried out at any (or even every) floor of the elevator system.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A method of configuring an elevator system (1), comprising:
    positioning a wireless communication device (4, 4') on or within an elevator car (2);
    when the elevator car (2) is in the vicinity of a landing floor (8a) of the elevator system (1), the wireless communication device (4, 4') transmitting data comprising part of a unique identification code to a landing fixture (10a, 12a, 14a, 16a, 18a) on the landing floor (8a), the landing fixture (10a, 12a, 14a, 16a, 18a) storing a landing fixture type identifier (42) and data comprising a landing floor identifier (26) associated with the landing floor (8a);
    the landing fixture (10a, 12a, 14a, 16a, 18a) receiving the data;
    the landing fixture (10a, 12a, 14a, 16a, 18a) generating the unique identification code from at least the landing floor identifier (26) and the landing fixture type identifier (42); and
    the landing fixture (10a, 12a, 14a, 16a, 18a) storing the unique identification code (44);
    further comprising the wireless communication device (4) communicating with an elevator system controller (22), and the elevator system controller (22) providing the landing floor identifier (26) of the landing floor (8a) to the wireless communication device (4).

2. The method of claim 1, wherein a wireless communication range of the wireless communication device (4, 4') is less than 1.5 m.

3. The method of claim 1, further comprising fixing the wireless communication device (4) to the elevator car (2); and
the wireless communication device (4') communicating with the landing fixture (10a, 12a, 14a, 16a, 18a) of the landing floor (8a), using the unique identification code (44), whenever the elevator car (2) is in the vicinity of the landing floor (8a) during normal operation of the elevator system.

4. The method of claim 1, wherein the landing floor (8a) comprises at least a first landing fixture (10a, 12a, 14a, 16a, 18a) and a second landing fixture (10a, 12a, 14a, 16a, 18a), and wherein the wireless communication device (4, 4') carries out the method as described above for the first landing fixture (10a, 12a, 14a, 16a, 18a) and then the second landing fixture (10a, 12a, 14a, 16a, 18a), sequentially.

5. The method of claim 1, further comprising repeating the method for every landing floor (8a, 8b, 8c, 8d) in the elevator system (1).

6. The elevator car (2) of claim 1, wherein the wireless communication device (4') is a mobile communication device, optionally a smart phone.

7. An elevator system (1), comprising:
an elevator car (2);
a wireless communication device (4, 4') positioned on or within an elevator car (2);
wherein when the elevator car (2) is in a vicinity of a landing floor (8a) of the elevator system (1), the wireless communication device (4, 4') transmitting data comprising part of a unique identification code to a landing fixture (10a, 12a, 14a, 16a, 18a) on the landing floor (8a), the landing fixture storing a landing fixture type identifier (42) and the data comprising a landing floor identifier (26) associated with the landing floor;
the landing fixture (10a, 12a, 14a, 16a, 18a) receiving the data;
the landing fixture (10a, 12a, 14a, 16a, 18a) generating the unique identification code (44) from the landing floor identifier (26) and the landing fixture type identifier (42); and
the landing fixture (10a, 12a, 14a, 16a, 18a) storing the unique identification code (44);
further comprising the wireless communication device (4) communicating with an elevator system controller (22), and the elevator system controller (22) providing a landing floor identifier (26) of the landing floor (8a) to the wireless communication device (4).

8. The elevator system (1) of claim 7, wherein the wireless communication range of the wireless communication device (4, 4') is approximately equal to half of the height of the landing floor (8a, 8b, 8c, 8d), and wherein the wireless communication device (4, 4') is positioned centrally with respect to the height of the elevator car (2).

9. The elevator system (1) of claim 7, wherein each of the at least one landing fixtures (10a, 12a, 14a, 16a, 18a) comprises a radio-frequency identification tag (120a, 140a, 160a, 180a).

10. A method of configuring an elevator system (1), comprising:
positioning a wireless communication device (4, 4') on or within an elevator car (2);
when the elevator car (2) is in the vicinity of a landing floor (8a) of the elevator system (1), the wireless communication device (4, 4') transmitting data comprising a unique identification code (44) to a landing fixture (10a, 12a, 14a, 16a, 18a) on the landing floor (8a), wherein the unique identification code is generated from at least the combination of a landing floor identifier (26) and a landing fixture type identifier (42);
the landing fixture (10a, 12a, 14a, 16a, 18a) receiving the data;
based on the received data, the landing fixture (10a, 12a, 14a, 16a, 18a) storing the unique identification code (44);
further comprising generating, by the wireless communication device (4, 4') the unique identification code; and
the wireless communication device (4) communicating with an elevator system controller (22), and the elevator system controller (22) providing the landing floor identifier (26) of the landing floor (8a) to the wireless communication device (4).

11. The method of claim 10, further comprising the landing fixture (10a, 12a, 14a, 16a, 18a) storing the landing fixture type identifier (42) and transmitting the landing fixture type identifier (42) to the wireless communication device (4, 4').

12. The method of claim 10, wherein the wireless communication range of the wireless communication device (4, 4') is less than 1.5 m.

* * * * *